United States Patent
Bialek et al.

(10) Patent No.: US 11,930,992 B2
(45) Date of Patent: Mar. 19, 2024

(54) CLEANING OF PET AREAS BY AUTONOMOUS CLEANING ROBOTS

(71) Applicant: iRobot Corporation, Bedford, MA (US)

(72) Inventors: Anders Bialek, Newton, MA (US); John Sinnigen, Cambridge, MA (US); Colin Angle, Beverly, MA (US); Michael J. Halloran, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 17/543,212

(22) Filed: Dec. 6, 2021

(65) Prior Publication Data

US 2022/0133110 A1 May 5, 2022

Related U.S. Application Data

(63) Continuation of application No. 16/663,684, filed on Oct. 25, 2019, now Pat. No. 11,191,407, which is a
(Continued)

(51) Int. Cl.
*A47L 9/28* (2006.01)
*A47L 7/04* (2006.01)
(Continued)

(52) U.S. Cl.
CPC .............. *A47L 9/2815* (2013.01); *A47L 7/04* (2013.01); *A47L 9/2821* (2013.01);
(Continued)

(58) Field of Classification Search
None
See application file for complete search history.

(56) References Cited

U.S. PATENT DOCUMENTS 5,369,347 A 11/1994 Yoo
6,176,201 B1 1/2001 Fields
(Continued)

FOREIGN PATENT DOCUMENTS

CN 107713913 2/2018
CN 107745387 3/2018
(Continued)

OTHER PUBLICATIONS

AmazonSmile, "Roborock S5 Robot Vacuum and Mop, Smart Navigating Robotic Vacuum Cleaner with 2000Pa Strong Suction & Wi-Fi connectivity for Pet Hair, Carpet & All Types of Floor," retrieved on Feb. 5, 2019, retrieved from <https://www.amazon.com/Roborock-Navigating-Robotic-Cleaner-connectivity/dp/B07GPH2K9P/ref=sr_1_2_sspa?s=vacuums&ie=UTF8&qid=154930%E2%80%A6&pldnSite=1>, 10 pages.
(Continued)

*Primary Examiner* — Ryan Rink
(74) *Attorney, Agent, or Firm* — Fish & Richardson P.C.

(57) ABSTRACT

An autonomous cleaning robot includes a drive operable to move the autonomous cleaning robot across a floor surface; a cleaning assembly configured to clean the floor surface; a receiver configured to receive an indication of cat activity in a cat box; and a controller configured to navigate the autonomous cleaning robot to the cat box to execute a cleaning mission in response to the received indication of cat activity.

17 Claims, 12 Drawing Sheets

Related U.S. Application Data continuation of application No. 16/264,268, filed on Jan. 31, 2019, now Pat. No. 10,463,217.

(51) Int. Cl.
*A47L 11/24* (2006.01)
*A47L 11/28* (2006.01)
*G05D 1/00* (2006.01)
*G05D 1/02* (2020.01)

(52) U.S. Cl.
CPC ............ *A47L 9/2826* (2013.01); *A47L 9/2852* (2013.01); *A47L 9/2857* (2013.01); *A47L 11/24* (2013.01); *A47L 11/28* (2013.01); *G05D 1/0287* (2013.01); *A47L 2201/04* (2013.01); *A47L 2201/06* (2013.01)

(56) References Cited

U.S. PATENT DOCUMENTS

| | | | |
|---|---|---|---|
| 6,565,668 B1 | 5/2003 | Sandberg et al. | |
| 7,024,278 B2 | 4/2006 | Chiappetta et al. | |
| 8,374,721 B2 | 2/2013 | Halloran et al. | |
| 9,265,396 B1 | 2/2016 | Lu et al. | |
| 9,433,186 B2 | 9/2016 | Romano | |
| 10,463,217 B1 | 11/2019 | Bialek et al. | |
| 11,191,407 B2 | 12/2021 | Bialek et al. | |
| 11,274,929 B1* | 3/2022 | Afrouzi | G06T 7/55 |
| 2002/0166573 A1 | 11/2002 | Policicchio et al. | |
| 2002/0189008 A1 | 12/2002 | Hipponsteel | |
| 2005/0241593 A1 | 11/2005 | Kaura | |
| 2008/0173247 A1 | 7/2008 | Mainini | |
| 2011/0130877 A1 | 6/2011 | Lynch | |
| 2012/0304412 A1 | 12/2012 | Lynch et al. | |
| 2012/0313786 A1 | 12/2012 | Clary et al. | |
| 2014/0060578 A1 | 3/2014 | Tomlinson | |
| 2015/0052703 A1 | 2/2015 | Lee et al. | |
| 2015/0209457 A1 | 7/2015 | Bonutti et al. | |
| 2016/0021844 A1 | 1/2016 | Peterson et al. | |
| 2017/0020354 A1 | 1/2017 | High et al. | |
| 2017/0251633 A1 | 9/2017 | Womble | |
| 2017/0293305 A1* | 10/2017 | Altomare | B01F 23/53 |
| 2017/0303505 A1 | 10/2017 | Karsijns et al. | |
| 2017/0309146 A1 | 10/2017 | Mackenzie et al. | |
| 2018/0070787 A1 | 3/2018 | Gordon et al. | |
| 2018/0078107 A1* | 3/2018 | Gagnon | A47L 9/20 |
| 2018/0184870 A1 | 7/2018 | Moon et al. | |
| 2018/0228335 A1* | 8/2018 | Miller | A47L 5/14 |
| 2018/0289225 A1 | 10/2018 | Izawa et al. | |
| 2018/0353042 A1 | 12/2018 | Gil et al. | |
| 2019/0061157 A1 | 2/2019 | Suvarna et al. | |
| 2020/0022553 A1* | 1/2020 | Gill | A47L 9/1409 |
| 2020/0205371 A1* | 7/2020 | Kuo | A01K 1/01 |
| 2020/0217057 A1 | 7/2020 | Shiro et al. | |
| 2020/0245836 A1 | 8/2020 | Bialek et al. | |
| 2020/0319640 A1* | 10/2020 | Vogel | A47L 9/2842 |

FOREIGN PATENT DOCUMENTS

| | | |
|---|---|---|
| CN | 108158588 | 6/2018 |
| GB | 2529166 | 2/2016 |
| WO | WO 2020/013394 | 1/2020 |

OTHER PUBLICATIONS

LitterRobot, "OpenAir. The Self-Clearing Litter Box Instruction Manual LR3-8008-0d," www.Litter-Robot.com, [undated], 40 pages.
European Search Report in EP Appln. No. EP20154900, dated May 28, 2020, 6 pages.

* cited by examiner

CLEANING OF PET AREAS BY AUTONOMOUS CLEANING ROBOTS

CLAIM OF PRIORITY

This application is a continuation application of, and claims priority to, U.S. patent application Ser. No. 16/663,684, now U.S. Pat. No. 11,191,407, filed on Oct. 25, 2019, which is a continuation application claiming priority to U.S. patent application Ser. No. 16/264,268, now U.S. Pat. No. 10,463,217, filed on Jan. 31, 2019. The contents of each are incorporated herein by reference in their entirety.

BACKGROUND

Cleaning robots include mobile robots that autonomously perform cleaning tasks within an environment, e.g., a home. Many kinds of cleaning robots are autonomous to some degree and in different ways. The cleaning robots include a controller that is configured to autonomously navigate the cleaning robot about the environment such that the cleaning robot can perform a mopping function or ingest debris as it moves.

SUMMARY

In an aspect, an autonomous cleaning robot includes a drive operable to move the autonomous cleaning robot across a floor surface; a cleaning assembly configured to clean the floor surface; a receiver configured to receive an indication of cat activity in a cat box; and a controller configured to navigate the autonomous cleaning robot to the cat box to execute a cleaning mission in response to the received indication of cat activity.

Embodiments can include one or more of the following features.

One or more signals transmitted from the cat box is a source of the indication that the cat box needs to be cleaned. One or more sensors monitoring the cat box initiate transmission of the one or more signals. Monitoring the cat box includes sensing presence of a cat or sensing presence of debris scattered proximate to the cat box.

The cleaning mission includes a first stage where a side brush of the autonomous cleaning robot is not active, and a second stage where the side brush of the autonomous cleaning robot is active.

In an aspect, an autonomous cleaning robot includes a drive operable to move the autonomous cleaning robot across a floor surface; a cleaning assembly configured to clean the floor surface; a receiver configured to receive an indication of pet activity in a pet area; and a controller configured to navigate the autonomous cleaning robot to the pet area to execute a cleaning mission in response to the received indication of pet activity.

Embodiments can include one or more of the following features.

One or more signals transmitted from pet equipment located in the pet area is a source of the indication that the pet area needs to be cleaned. One or more sensors monitoring the pet equipment initiate transmission of the one or more signals. Monitoring the pet equipment includes sensing presence of a pet or sensing presence of debris scattered at pet area.

A parameter of the cleaning mission depends upon the pet area that needs to be cleaned. The parameter includes a vacuum power level of the autonomous cleaning robot. When the pet area includes a bird cage, the vacuum power level of the autonomous cleaning robot is higher than when the pet area includes pet equipment for a dog or cat.

The parameter includes a type of cleaning by the autonomous cleaning robot.

A vacuum power level of the autonomous cleaning robot is increased during the cleaning mission to ventilate an undesirable scent at the pet area. The autonomous cleaning robot includes a hookup to attach the autonomous cleaning robot to a port of pet equipment at the pet area for ventilating an undesirable scent.

The autonomous cleaning robot includes a hookup to attach the autonomous cleaning robot to a port of pet equipment at the pet area for ventilating an undesirable scent.

The cleaning assembly is configured to vacuum debris from the floor surface.

An underside portion of the autonomous cleaning robot includes a cleaning pad holder for attaching a cleaning pad configured to hold liquid.

In an aspect, a method of operating an autonomous cleaning robot includes receiving, at a computing device, an indication of activity of a pet at a pet area; determining a cleaning mission and one or more cleaning mission parameters for cleaning the pet area; and initiating, to the autonomous cleaning robot, a transmission including data for causing the autonomous cleaning robot to initiate the cleaning mission using the one or more cleaning mission parameters.

Embodiments can include one or more of the following features.

The one or more cleaning parameters represent a start time for the cleaning mission, the start time being provided by a user handheld computing device.

Sensor monitoring of pet equipment at the pet area provides the indication of the pet activity at the pet area.

The method includes determining one or more of the cleaning mission parameters based on a characteristic of the pet area. One of the cleaning mission parameters includes a vacuum power level, and including determining the vacuum power level based on an identity of the pet area.

One of the cleaning mission parameters includes a vacuum power level for ventilating an undesirable scent.

One of the cleaning mission parameters includes a wet or dry mopping setting.

The approaches to cleaning of pet areas by autonomous cleaning robots as described here can have one or more of the following advantages. Pet debris left in a pet area by a pet, e.g., a cat using a litter box, a dog entering through a pet door, a bird eating seeds in its cage, can be cleaned promptly and efficiently. The ability to detect an indication of pet activity at a pet area and in response deploy an autonomous cleaning robot to clean the pet area reduces the burden on the pet owner to attend to cleaning tasks typically associated with pet ownership. By cleaning pet areas promptly, less pet debris is tracked around other areas, such as other rooms of a house, contributing to generally enhanced household cleanliness.

The details of one or more implementations are set forth in the accompanying drawings and the description below. Other features and advantages will be apparent from the description and drawings, and from the claims.

DETAILED DESCRIPTION

Described herein is an approach to deploying an autonomous cleaning robot, such as a vacuum cleaning robot or a mopping robot, to clean a pet area, such as the area in the vicinity of a litter box, dog door, pet food or water dish, bird or small animal cage, or other type of pet area. Sensors in the pet area detect signals indicative of pet activity in the pet area, such as the presence of a pet in the pet area, motion in the pet area, or the presence of pet debris, such as food, litter, dirt, or pet hair, in the pet area. Responsive to the detection of pet activity in the pet area, an autonomous cleaning robot can be deployed to execute a cleaning mission in the pet area. The deployment of the autonomous cleaning robot can be automatic, e.g., based on an automated determination that the signals sensed by the sensors in the pet area are indicative of pet activity; or can be in response to user input, e.g., based on a user viewing information indicative of the detected signals.

Figure 1A:
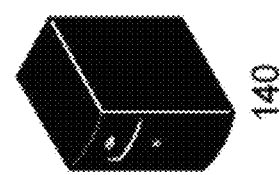
FIGS. 1A, 1B, and 2-5 are diagrams of example environments for an autonomous cleaning robot.

Referring to FIG. 1A, in an example environment 100, an autonomous cleaning robot 110 is operable to clean a pet area 120 in the vicinity of a litter box 122, such as a litter box for a cat. The autonomous cleaning robot 110 can be operable to clean pet debris 124 from the floor or other surface on which the litter box 122 is disposed. The pet debris 124 can include cat litter that has been tracked out of the litter box 122, e.g., when a cat exits the litter box 122. The pet debris 124 can include other types of debris, such as dirt, cat hair, or other debris.

In some examples, the autonomous cleaning robot 110 can be configured for vacuum cleaning. In some examples, an autonomous cleaning robot can employ a wet cleaning pad configured to hold liquid and to be used during a mopping cleaning mission (e.g., autonomous cleaning robot 111 shown in FIG. 5). In some examples, the autonomous cleaning robot 111 (again referring briefly to FIG. 5) can employ a dry cleaning pad configured to be used for sweeping or dusting. In some examples, a single autonomous cleaning robot can be configured for both vacuum cleaning and mopping, and can be operable to clean the pet area 120 by first vacuum cleaning the pet area and then mopping the pet area. In some examples, a set of autonomous cleaning robots can be operable to clean the pet area 120 as a team. For instance, a first autonomous cleaning robot (e.g., the autonomous cleaning robot 110) can vacuum clean the pet area, and subsequently a second autonomous cleaning robot (e.g., the autonomous cleaning robot 111 of FIG. 5) can mop the pet area.

Figure 1A:
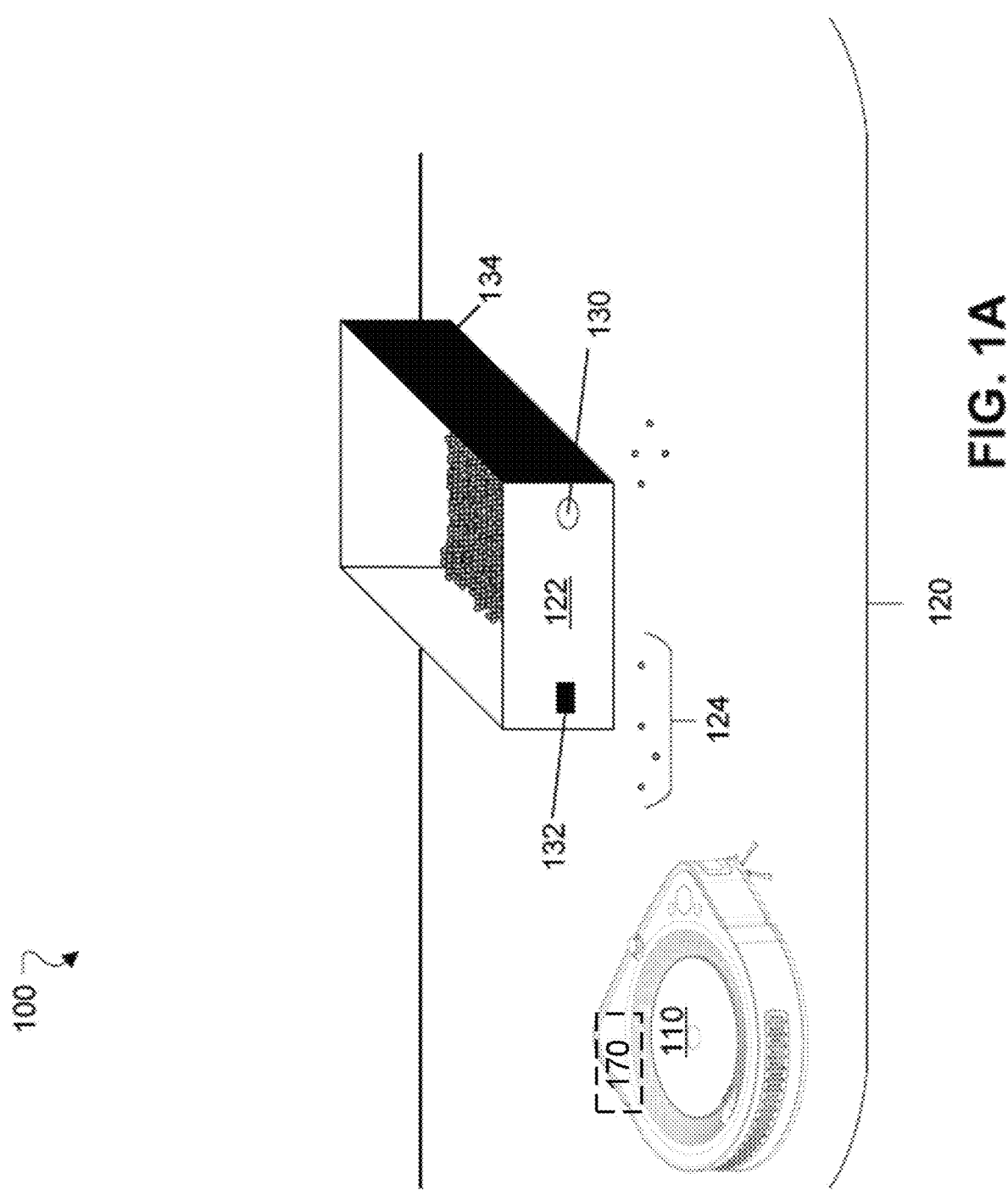

A sensor 130 in the pet area 120 is configured to sense a characteristic of the pet area 120 indicative of pet activity in the pet area 120. An indication of pet activity can include an indication of the presence of a pet or pet debris in the pet area. Example characteristics indicative of pet activity in a pet area can include, e.g., the presence of pet debris 124 outside the litter box, the presence of a pet in or near the litter box, the exiting of a pet from the litter box, the sound of cat litter hitting the floor, or another characteristic of the pet area. The sensor 130 can be incorporated into the litter box 122 (as shown in FIG. 1), e.g., integrated into or attached to a wall or base of the litter box, or can be disposed in the pet area 120.

In some examples, the sensor 130 can be an optical sensor, such as a camera, that captures images of an exterior of the litter box 122, e.g., that can be analyzed to detect the presence of pet debris 124 outside of the litter box 122. In some examples, the sensor 130 can be an optical sensor, such as a camera, that can detect the presence of a cat in the litter box 122. In some examples, the sensor 130 can be a motion sensor that detects motion in the vicinity of the litter box 122, e.g., motion of a cat entering or exiting the litter box 122. The motion sensor can be sensitive to a direction of the motion, e.g., to distinguish between a cat entering the litter box and a cat exiting from the litter box. In some examples, the sensor 130 can be a weight sensor that detects a weight of contents of the litter box 122, which can be indicative of, e.g., the presence of a cat in the litter box. In some examples, the sensor 130 can be a pressure sensor, such as a capacitive sensor having a capacitance that changes with applied pressure, that can detect a pressure applied by the contents of the litter box 122, e.g., indicative of the presence of a cat in the litter box. In some examples, the sensor 130 can be an acoustic sensor that detects the sound of cat litter scattering on the floor. Other types of sensors 130 can also be used, such as an infrared sensor, a break sensor, or another type of sensor capable of sensing a characteristic of the pet area 120 indicative of pet activity in the pet area 120.

A transmitter 132 is electronically coupled to the sensor 130, e.g., by a wired or wireless connection, such as a short-range wireless connection. In some examples, the transmitter 132 transmits signals detected by the sensor 130 to a remote computing device 140, such as a cloud-based computing system, via a wired or wireless connection, such as a wireless Internet connection. In some examples, the signals transmitted by the transmitter 132 can provide identification of the type of pet area 120, e.g., a litter box 122, a dog food bowl, a bird cage, a dog door, or another type of pet area.

The remote computing device 140 processes the signals to determine whether the signal is indicative of pet activity in the pet area 120 (discussed further below). When it is determined that the signal is indicative of pet activity, the remote computing device 140 transmits a command to the autonomous cleaning robot 110 instructing the autonomous cleaning robot 110 to execute a cleaning mission in the pet area 120. A cleaning mission is a period of operation of the autonomous cleaning robot 110 in which the autonomous cleaning robot cleans a floor surface according to a set of cleaning parameters, including scheduling parameters (e.g., start time, duration), execution parameters (e.g., vacuum power level, type of cleaning), and navigational parameters (e.g., an indication of the area to be cleaned). In some examples, executing a cleaning mission in the pet area 120 can include cleaning the pet area 120 and all areas within a specified range (e.g., 1-5 feet) of the pet area. In some examples, executing a cleaning mission in the pet area 120 can include a first stage of vacuum cleaning the pet area 120 and all areas within a specified range of the pet area using a specified vacuum power level, and a second stage of wet mopping the pet area 120.

In some examples, the cleaning mission can include multiple stages. For instance, the cleaning mission can include a first stage in which the autonomous cleaning robot 110 cleans the pet area 120 with a side brush of the autonomous cleaning robot not being active, and a second stage in which the autonomous cleaning robot 110 again cleans the pet area with the side brush activated. Operation of the side brush of an autonomous cleaning robot 110 can cause debris in the path of the autonomous cleaning robot to be scattered, e.g., pet debris 124 can be scattered outside the pet area 120 by operation of the side brush. This example two-stage cleaning mission helps to reduce such scattering of debris.

When the autonomous cleaning robot 110 receives a command to execute a cleaning mission in the pet area 120, the autonomous cleaning robot 110 navigates to the location of the pet area 120 to execute the cleaning mission according to the command, e.g., according to one or more cleaning parameters for the cleaning mission (discussed further below). In some examples, the location of the pet area 120 can be identified by an imaging device, such as a camera, on the autonomous cleaning robot 110. For instance, the autonomous cleaning robot 110 can explore an area, such as a room, until the camera captures an image of the pet area 120, and the autonomous cleaning robot 110 can then navigate to the pet area 120. In some examples, the location of the pet area 120 can be identified by user indication, e.g., by user input into a user interface of a computing device. In some examples, the location of the pet area 120 can be identified by wireless (e.g., Wi-Fi) localization. In some examples, the autonomous cleaning robot 110 can have previously generated a map of an area, such as a room, in which the pet area 120 is located, and the autonomous cleaning robot 110 can rely on the previously generated map in navigating to the pet area 120.

In some examples, the litter box 122 can include a port 134, such as an opening, a door or hatch, or a port sized and dimensioned to interlock with a mating feature, such as a hookup 170, on the autonomous cleaning robot 110. In operation, the autonomous cleaning robot 110 can be a vacuum cleaning robot that can move near the port 134 and can suck in air from the interior of the litter box 122 through the port 134. The air sucked in through the port 134 can be passed through a filter of the autonomous cleaning robot 110, e.g., to ventilate an undesirable scent in the interior of the litter box 122. In some examples, the autonomous cleaning robot 110 can suck in and filter air in the general vicinity of the litter box 122, e.g., to ventilate an undesirable scent in the general vicinity of the litter box 122. In some examples, a vacuum power of the autonomous cleaning robot 110 can be increased for a scent ventilation portion of the cleaning mission.

Figure 1B:
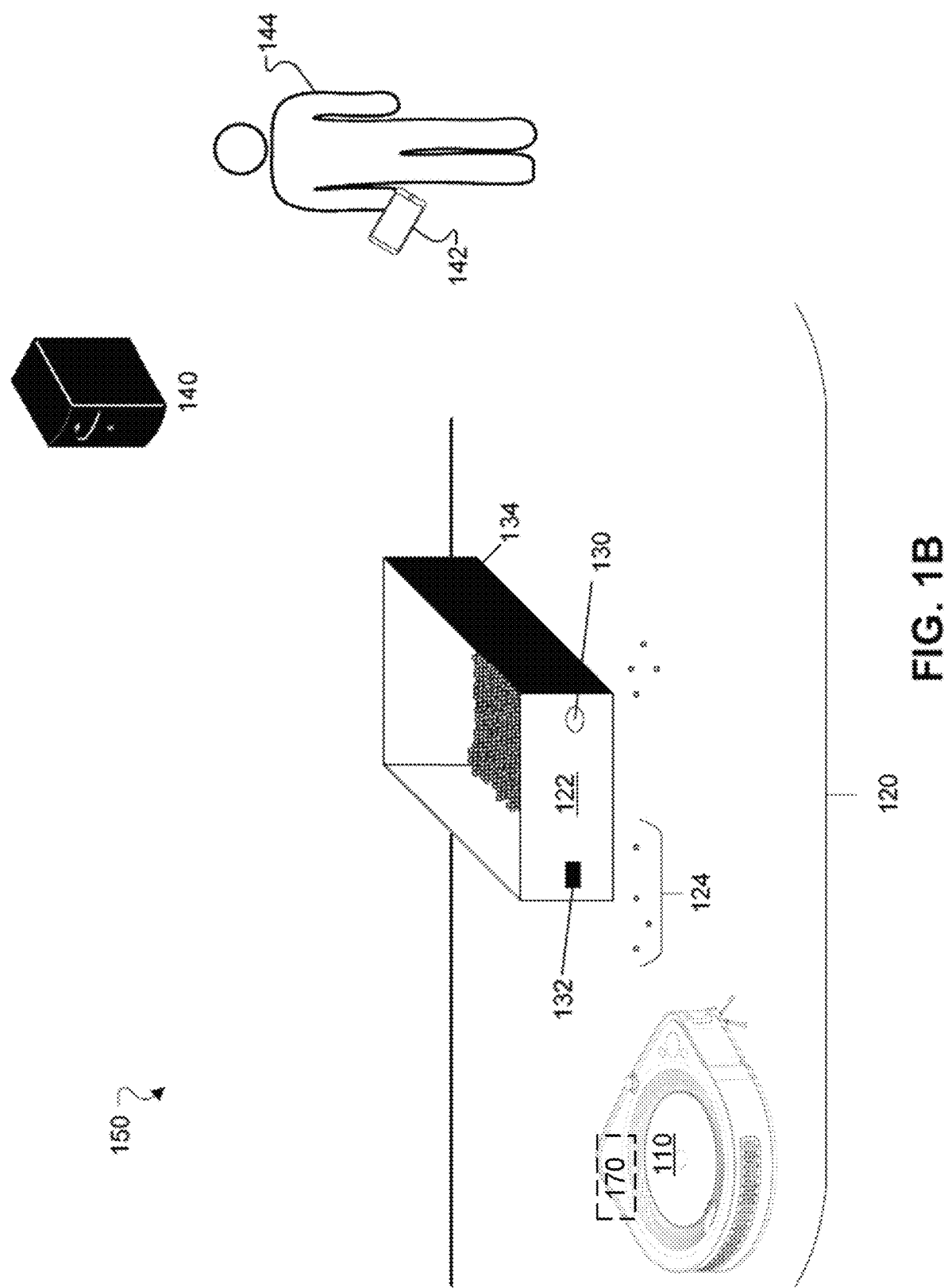

Referring to FIG. 1B, in an example environment 150, the transmitter 132 transmits signals detected by the sensor 130 to a mobile device 142, such as a mobile phone, tablet, wearable computing device, or other type of mobile computing device. Information based on the transmitted signals can be presented on a display interface of the mobile device 142, e.g., for review by a user 144. The user 144 can provide an input into the mobile device 142 indicating that the user would like the autonomous cleaning robot 110 to clean the pet area 120, e.g., when the user determines that the signals are indicative of pet activity in the pet area 120. In some examples, responsive to receipt of the user input, the mobile device 142 can transmit a command to the autonomous cleaning robot 110 instructing the autonomous cleaning robot 110 to execute a cleaning mission in the pet area 120. In some examples, responsive to receipt of the user input, the mobile device 142 can transmit a signal to the remote computing device 140, which can then transmit a command to the autonomous cleaning robot 110 instructing the autonomous cleaning robot 110 to execute a cleaning mission in the pet area 120.

Figure 2:
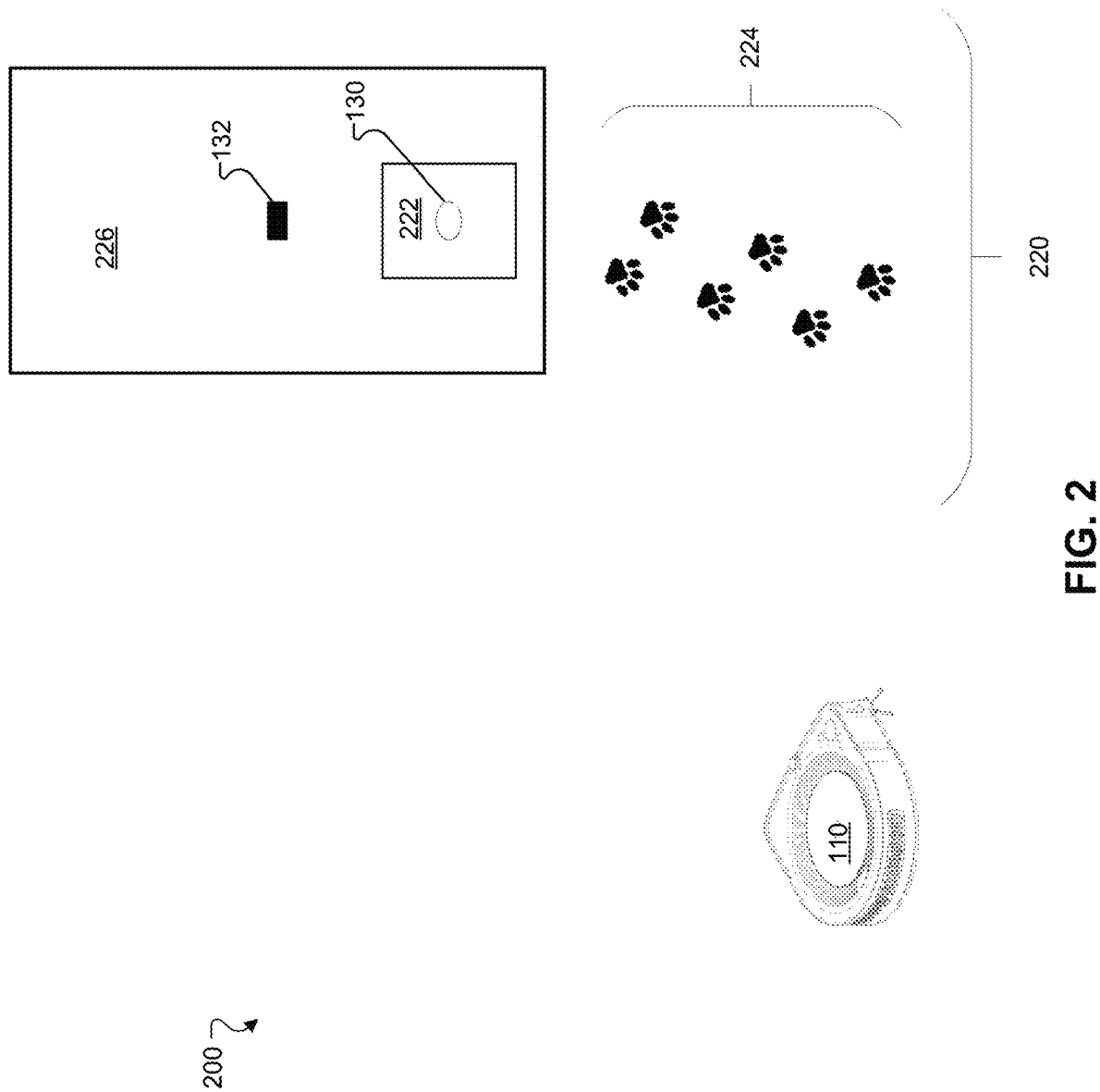

Referring to FIG. 2, in an example environment 200, the autonomous cleaning robot 110 is operable to clean a pet area 220 in the vicinity of a pet door, such as a pet door 222 installed in a larger door 226, such as the door of a house. In the example of FIG. 2, the sensor 130 and transmitter 132 are incorporated into the pet door 222, e.g., integrated into or attached to the pet door 222. In some examples, the sensor 130 and transmitter 132 can be disposed elsewhere in the pet area 220, such as on the larger door, a door frame, on a nearby wall, or elsewhere. The sensor 130 is configured to sense a characteristic of the pet area 220 indicative of pet activity in the pet area 220, such as the presence of pet debris 224 such as dirt, footprints, or pet hair; the presence of a pet in the pet area 220; the motion of the pet door 222, the sound of a pet scratching on the pet door 220; or another characteristic of the pet area.

In some examples, the sensor 130 can be an optical sensor, such as a camera, that captures images of the floor in front of the pet door 222, e.g., that can be analyzed to detect the presence of pet debris 224. In some examples, the sensor 130 can be a motion sensor that detects motion of the pet door 222. The motion sensor can be sensitive to a direction of the motion, e.g., to distinguish between a pet entering the pet door 222 and a pet exiting from the pet door 222. In some examples, the sensor 130 can be an acoustic sensor that detects the sound of an animal scratching at the pet door 222. Other types of sensors 130 can also be used in conjunction with the pet door 222.

Figure 3:
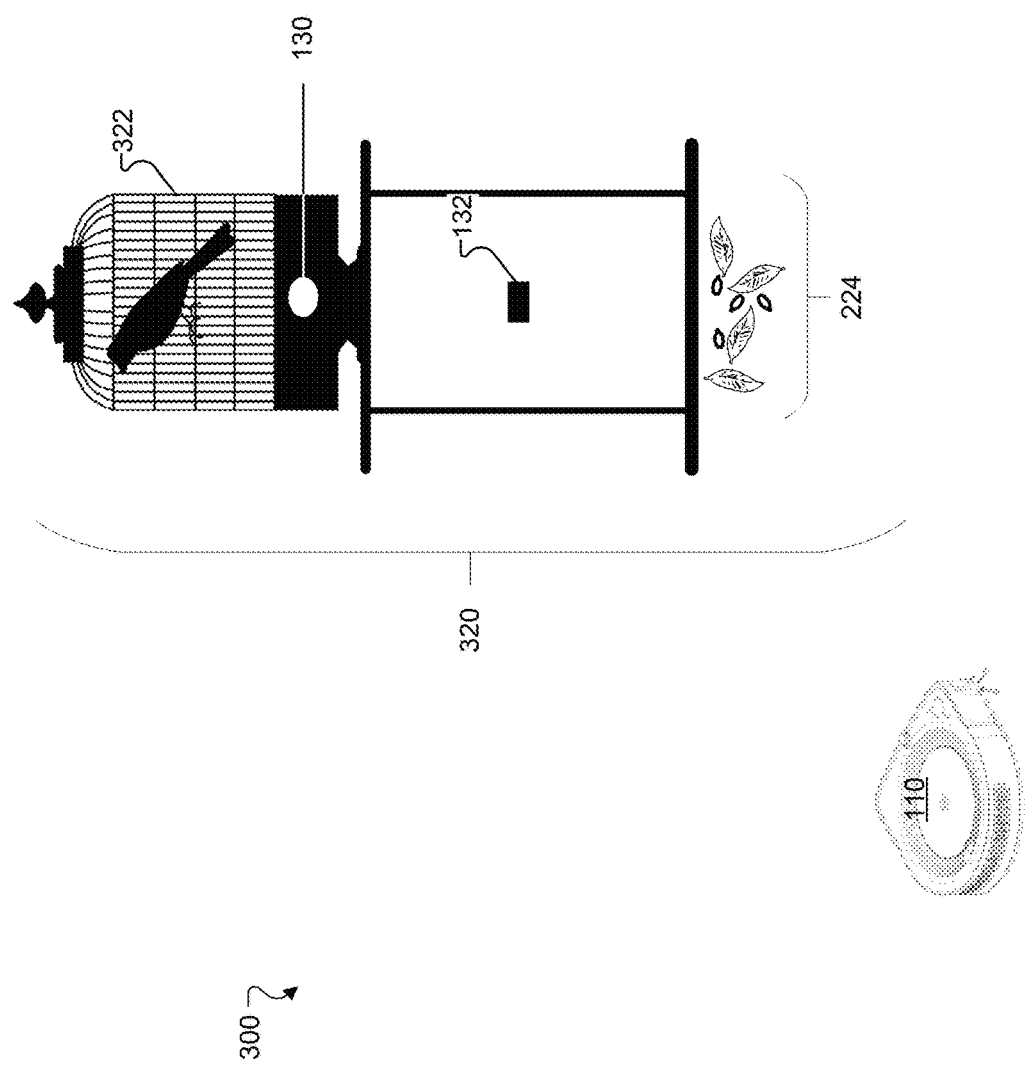

Referring to FIG. 3, in an example environment 300, the autonomous cleaning robot 110 is operable to clean a pet area 320 in the vicinity of a bird cage 322. In the example of FIG. 3, the sensor 130 and transmitter 132 are incorporated into the structure of the bird cage 322, e.g., integrated into or attached to the bird cage 322 and its base. In some examples, the sensor 130 and transmitter 132 can be disposed elsewhere in the pet area 320. The sensor 130 is configured to sense a characteristic of the pet area 320 indicative of pet activity in the pet area 320, such as the presence of pet debris 324 such as food or feathers on the ground; the motion of pet debris falling to the ground; or another characteristic of the pet area.

Figure 4:
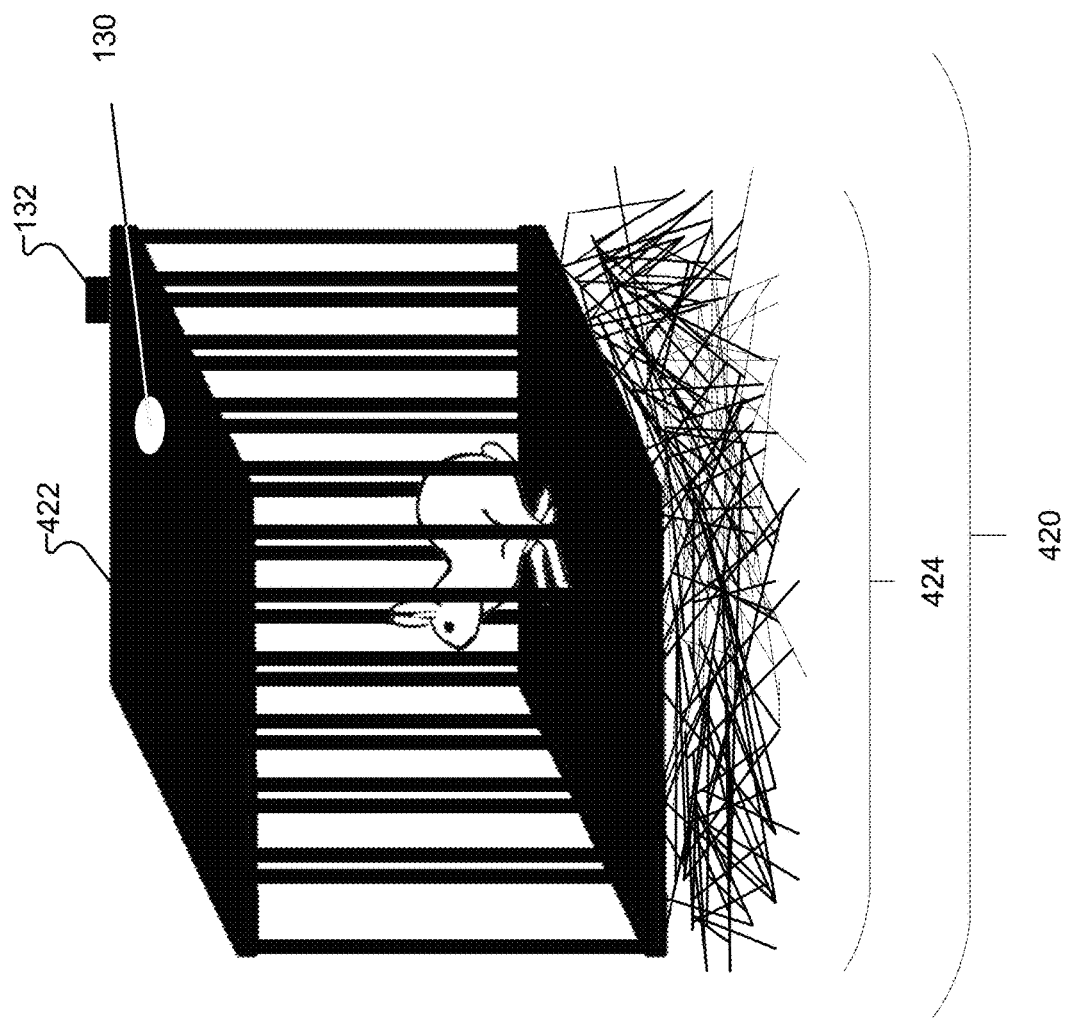
Figure 4:

Referring to FIG. 4, in an example environment 400, the autonomous cleaning robot 110 is operable to clean a pet area 420 in the vicinity of a cage 422 for a small animal, such as a rabbit, guinea pig, hamster, or other small animal. In the example of FIG. 4, the sensor 130 and transmitter 132 are incorporated into the structure of the cage 422, e.g., integrated into or attached to the cage 422. In some examples, the sensor 130 and transmitter 132 can be disposed elsewhere in the pet area 420. The sensor 130 is configured to sense a characteristic of the pet area 420 indicative of pet activity in the pet area 420, such as the presence of pet debris 424 such as food, pet hair, or cage lining material (e.g., hay or wood chips); or another characteristic of the pet area.

Figure 5:
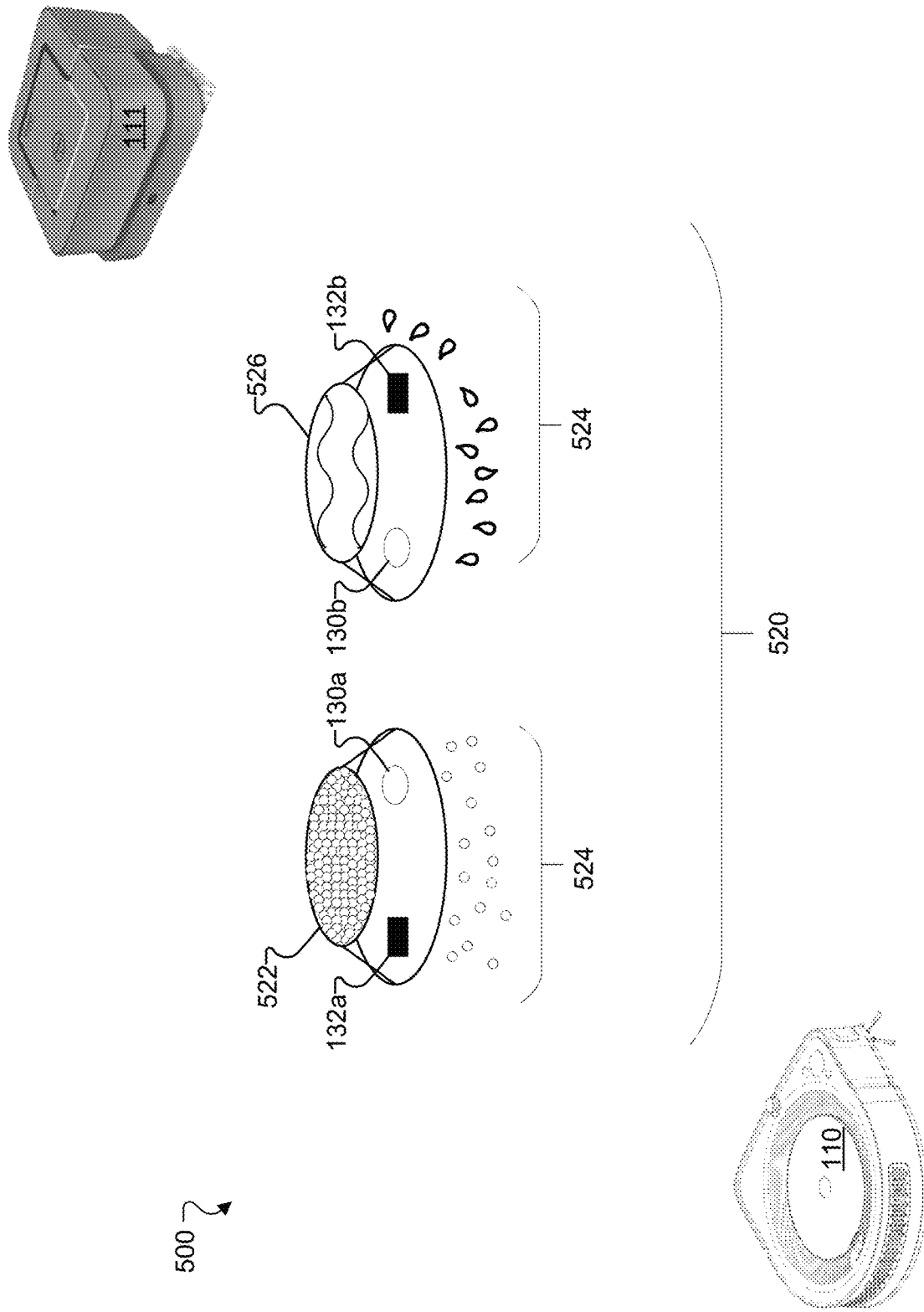

Referring to FIG. 5, in an example environment 500, two autonomous cleaning robots 110, 111 are operable (e.g., by vacuuming, mopping, etc.) to clean a pet area 520 in the vicinity of a pet food bowl 522 and a pet water dish 526. Pet debris 524 in the pet area 520 can be, e.g., spilled pet food, pet hair, spilled water, or other types of pet debris. The autonomous cleaning robots 110, 111 can be different types of cleaning robots. For instance, the autonomous cleaning robot 110 can be a robot configured for a vacuum cleaning mission and the autonomous cleaning robot 111 can be a robot configured for a wet mopping mission.

A sensor 130*a* and transmitter 132*a* are incorporated into the pet food bowl 522, e.g., integrated into or attached to the pet food bowl 522. A sensor 130*b* and transmitter 132*b* are incorporated into the pet water dish 526. Each transmitter 132*a*, 132*b* transmits signals detected by the corresponding sensors 130*a*, 130*b*, respectively. In some examples, the sensors 130a, 130b are the same type of sensor. For instance, the sensors 130a, 130b can be optical sensors that capture images of a pet at the pet food bowl 522 and the pet water dish 524, respectively. In some examples, the sensors 130a, 130b can be different types of sensors. For instance, the sensor 130a can be an acoustic sensor that detects the sound of pet food hitting the floor, and the sensor 130b can be a weight sensor that detects decreasing weight of the water in the pet water dish 524.

When pet activity has been detected in the pet area 520, a command is transmitted to one or both autonomous cleaning robots 110, 111 with instructions for a cleaning mission. The autonomous cleaning robot to which the command is transmitted can depend on the sensor that detected the characteristic indicative of pet activity in the pet area 520. For instance, detection by the sensor 130a of pet food spilled on the floor can result in the command being transmitted to the vacuum cleaning robot 110, while detection by the sensor 130b of decreasing water volume in the pet water dish 524 can result in the command being transmitted to the wet mopping robot 111.

Figure 6:
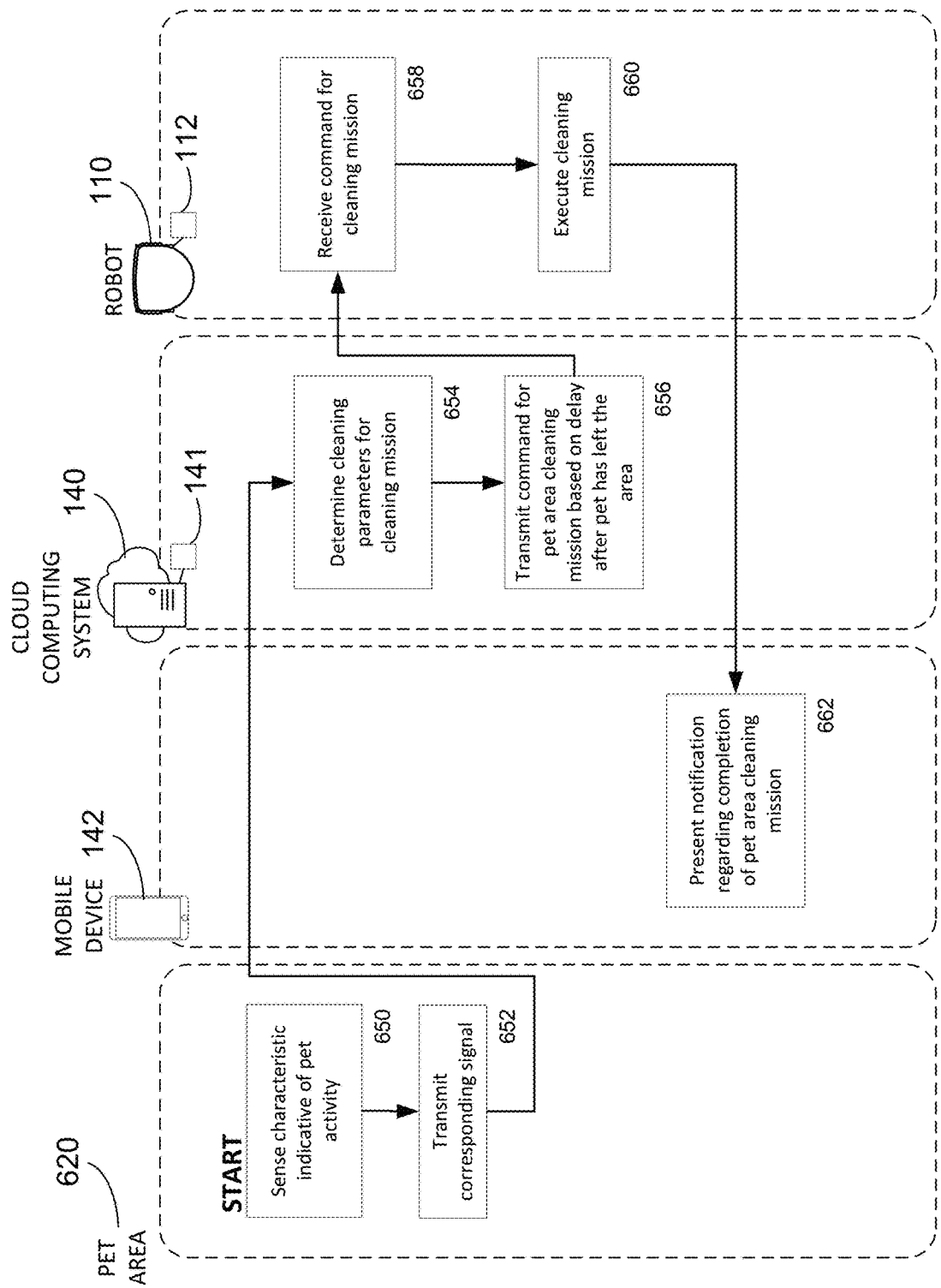
FIGS. 6 and 7 are process flow diagrams.

Referring to FIG. 6, in an example process flow for causing the autonomous cleaning robot 110 to execute a cleaning mission in a pet area 620, a sensor in the pet area senses (650) a characteristic of the pet area 620 indicative of pet activity in the pet area. The characteristic of the pet area 620 can be, e.g., the presence of an animal in the pet area, the motion of an animal entering or exiting the pet area, the presence of pet debris in the pet area, or another characteristic. A signal is transmitted (652) from the pet area 620 to a remote computing device, e.g., via a wired or wireless Internet connection. For instance, the remote computing device can be a cloud-based computing system 140 having one or more processors 141. In some examples, signals can be transmitted intermittently, e.g., when a sensor in the pet area 620 has sensed a characteristic (e.g., motion). In some examples, signals can be transmitted periodically or streamed.

In some examples, receipt of a signal at the cloud-based computing system 140 is sufficient to trigger a determination that the signal is indicative of pet activity in the pet area 620. For instance, when the pet area 620 includes a pet door, a motion sensor may provide a signal only when motion is detected, and receipt of a signal detected by a motion sensor can be sufficient to indicate pet activity in the pet area 620. In some examples, the cloud-based computing system 140 can process one or more received signals to determine whether the signals are indicative of pet activity in the pet area 620. In an example, the cloud-based computing system 140 can perform image processing of images transmitted from the pet area 620 to identify the presence of pet debris in the pet area 620. In another example, the cloud-based computing system 140 can determine whether a change in weight or capacitance between successive signals is indicative that a cat has exited a litter box in the pet area 620.

When it is determined that pet activity has been detected in the pet area 620, the cloud-based computing system 140 determines (654) cleaning parameters for the cleaning mission. Cleaning parameters can include, e.g., scheduling parameters (such as a start time or a duration), execution parameters (such as a vacuum power level or a type of cleaning, e.g., spot cleaning, edge cleaning, vacuum cleaning, wet cleaning, etc.), and navigational parameters (e.g., an indication of an area to be cleaned, such as a range from a target location or a boundary defining the area to be cleaned). In some examples, the start time can include a delay after the animal has left the pet area, e.g., to help reduce the risk that the animal may continue to soil the pet area. In some examples, the cleaning parameters can depend on the nature of the pet area 620, such as the type of pet area (e.g., litter box, food dish, pet door, bird cage, etc.). For instance, if the pet area 620 includes a bird cage, the cleaning parameters can indicate a more intensive cleaning, e.g., a higher vacuum power for a vacuum cleaning mission, than if the pet area 620 includes a litter box. For instance, if the pet area 620 includes a pet door, the cleaning parameters can indicate wet cleaning.

The cloud-based computing system 140 transmits (656) a command to the autonomous cleaning robot 110, e.g., via a wired or wireless Internet connection, to cause the autonomous cleaning robot 110 to execute a cleaning mission according to the cleaning parameters. For instance, the cleaning parameters can instruct the autonomous cleaning robot 110 to perform specific cleaning tasks in the pet area 620. In some examples, the command can be transmitted at a scheduled time, such as based on a time delay after the pet has left the pet area 620.

In some examples, the cloud-based computing system 140 can check whether the scheduling parameters for the pet area cleaning mission conflict with a previously scheduled cleaning mission. If the scheduling parameters for the pet area cleaning mission do conflict with a previously stored schedule, the cloud-based computing system 140 can transmit a notification to a mobile device 142 of a user of the autonomous cleaning robot 110 asking for a selection of either the pet area cleaning mission or the previously scheduled cleaning mission, or can reschedule either the pet area cleaning mission or the previously scheduled cleaning mission without user input.

The autonomous cleaning robot 110 receives the command (658) and one or more processors 112 of the autonomous cleaning robot 110 cause the autonomous cleaning robot 110 to execute (660) the cleaning mission according to the cleaning parameters. In some examples, following completion of the cleaning mission, the autonomous cleaning robot 110 can transmit a notification for presentation (662) on the mobile device 142, e.g., via a wireless Internet connection or a short-range communications protocol, indicative that the cleaning mission in the pet area 620 has been completed. In some examples, the autonomous cleaning robot 110 can transmit a notification to the cloud-based computing system 140 indicative that the cleaning mission has been completed.

Figure 7:
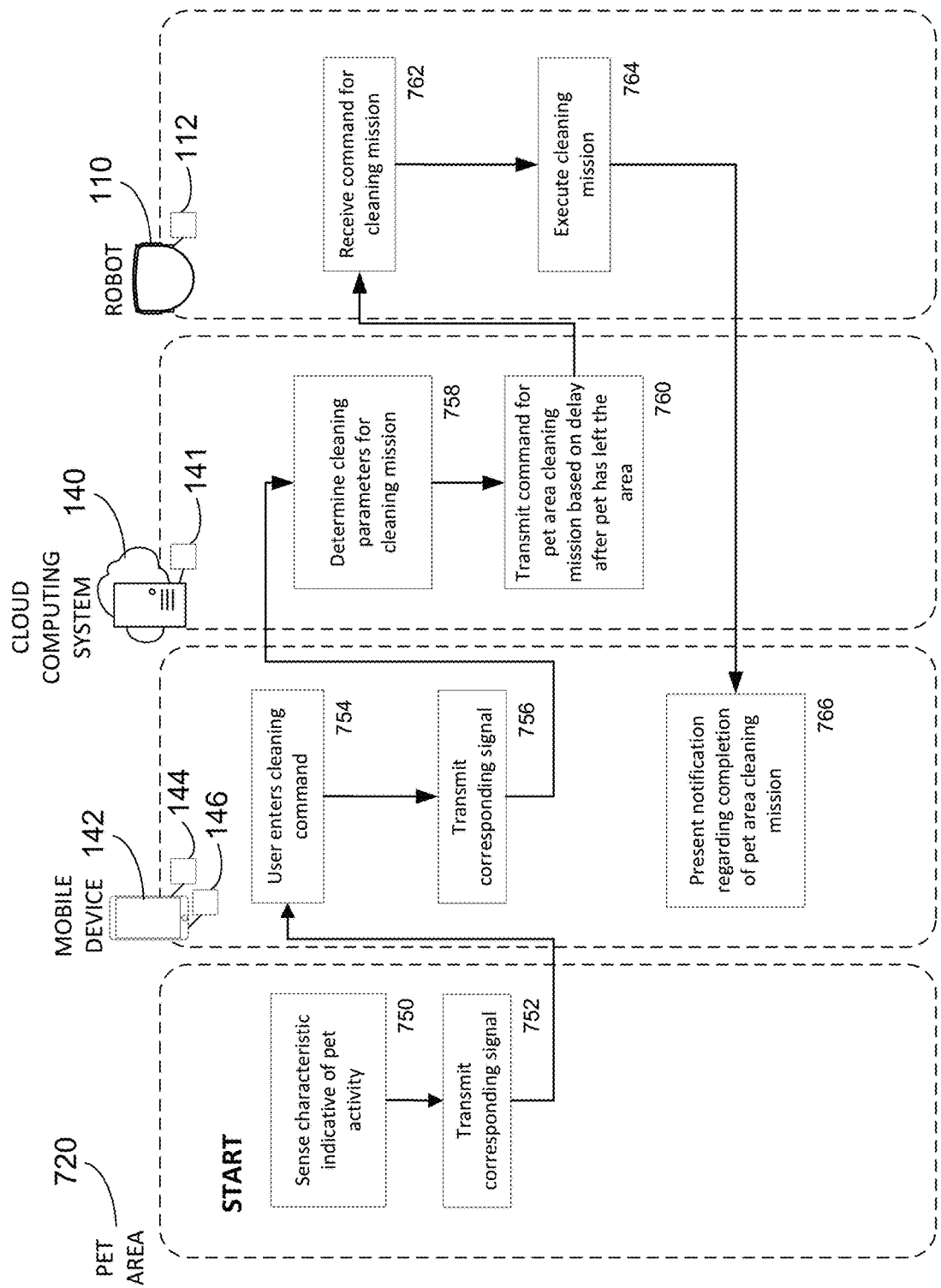

Referring to FIG. 7, in an example process flow for causing an autonomous cleaning robot 110 to execute a cleaning mission in a pet area 720, a sensor in the pet area senses (750) a characteristic of the pet area 720 indicative of pet activity in the pet area 720. The characteristic of the pet area 720 can be, e.g., the presence of an animal in the pet area, the motion of an animal entering or exiting the pet area, the presence of pet debris in the pet area, or another characteristic. A signal is transmitted (752) from the pet area 720 to the mobile device 142 of a user of the autonomous cleaning robot 110, e.g., via a wireless Internet connection or a short-range communications protocol. In some examples, signals can be transmitted intermittently, e.g., when a sensor in the pet area 720 has sensed a characteristic (e.g., motion). In some examples, signals can be transmitted periodically or streamed.

The mobile device 142 includes one or more processors 144 configured to execute a mobile application 146 for presentation of scheduling interfaces for the autonomous cleaning robot 110 on a display of the mobile device 142. Based on the signal received by the mobile device 140 from the pet area, information is displayed through the scheduling interfaces of the mobile device 140. For instance, images of the pet area 720, timestamps at which motion of a pet door was detected, a graph showing sensed weight of a litter box, or other information can be displayed. The user can review the displayed information and determine whether the displayed information is indicative of pet activity in the pet area 720.

The user can input (754) a cleaning command into the mobile device 142. In some examples, the user can input the cleaning command by a physical interaction, such as a button or a touch screen display. In some examples, the user can input a spoken cleaning command that can be processed by natural language processing to prepare the command. In some examples, the cleaning command can be an indication that a cleaning mission should be executed by the autonomous cleaning robot 110. In some examples, the cleaning command can specify one or more cleaning parameters for the cleaning mission, such as a start time, a duration, a type of cleaning, or another cleaning parameter.

A signal indicative of the cleaning command is transmitted (756) to the cloud-based computing system 140, e.g., via a wired or wireless Internet connection. The cloud-based computing system 140 determines (758) cleaning parameters for the cleaning mission. In some examples, the determination of cleaning parameters can be based at least in part on the cleaning parameters specified by the user-inputted cleaning command. The cloud-based computing system 140 transmits (760) a command to the autonomous cleaning robot 110, e.g., via a wired or wireless Internet connection, to cause the autonomous cleaning robot 110 to execute a cleaning mission according to the cleaning parameters. In some examples, the command can be transmitted at a scheduled time, such as based on a time delay after the pet has left the pet area 720.

The autonomous cleaning robot 110 receives the command (762) and the one or more processors 112 of the autonomous cleaning robot 110 cause the autonomous cleaning robot 110 to execute (764) the cleaning mission according to the cleaning parameters. In some examples, following completion of the cleaning mission, the autonomous cleaning robot 110 can transmit (766) a notification to the mobile device 142, the cloud-based computing system 140, or both, indicative that the cleaning mission has been completed.

Figure 8:
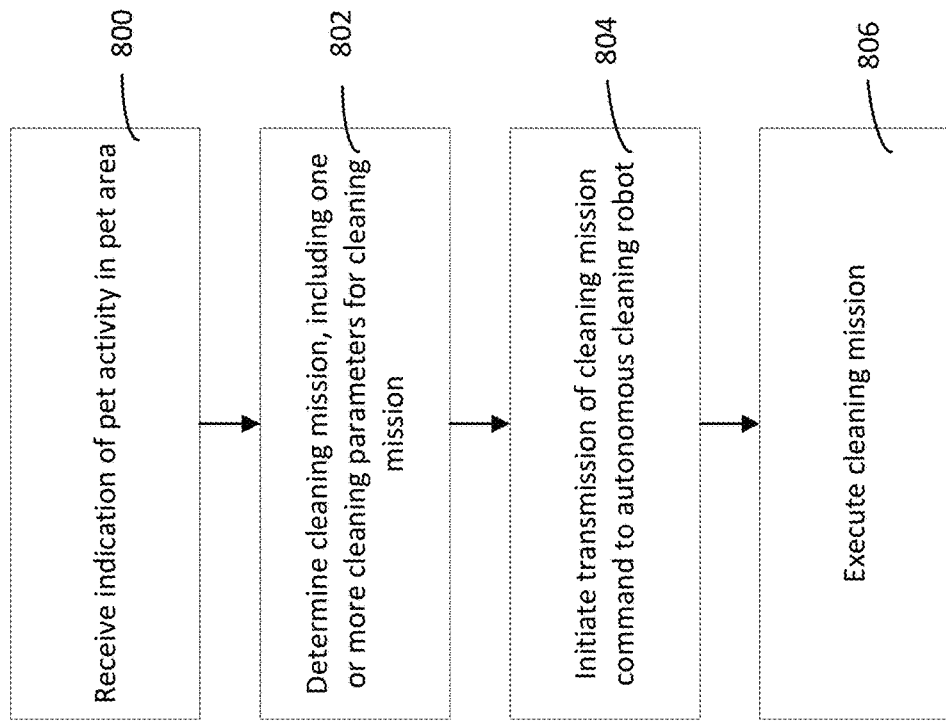
FIG. 8 is a flow chart.

Referring to FIG. 8, in an example process for operating an autonomous cleaning robot, an indication of pet activity in a pet area is received (800) at a computing device, such as a cloud-based computing device or a mobile device. The indication of pet activity can be received from one or more sensors in the pet area.

A cleaning mission, including one or more cleaning parameters for the cleaning mission, is determined (802) for cleaning the pet area. The cleaning parameters can include, e.g., a start time for the cleaning mission, a duration of the cleaning mission, a type of cleaning for the cleaning mission (e.g., vacuum cleaning or wet or dry mopping), or other parameters. In some examples, the cleaning parameters can be provided through a mobile device, e.g., by a spoken input that is processed by the mobile device or by the cloud-based computing device using natural language processing. In some examples, the cleaning parameters can be determined by the cloud-based computing device, e.g., based on the nature of the pet area.

A transmission to the autonomous cleaning robot is initiated (804). The transmission includes data, such as a command, that cause the autonomous cleaning robot to initiate and execute (806) the cleaning mission according to the one or more cleaning parameters.

Figure 9A:
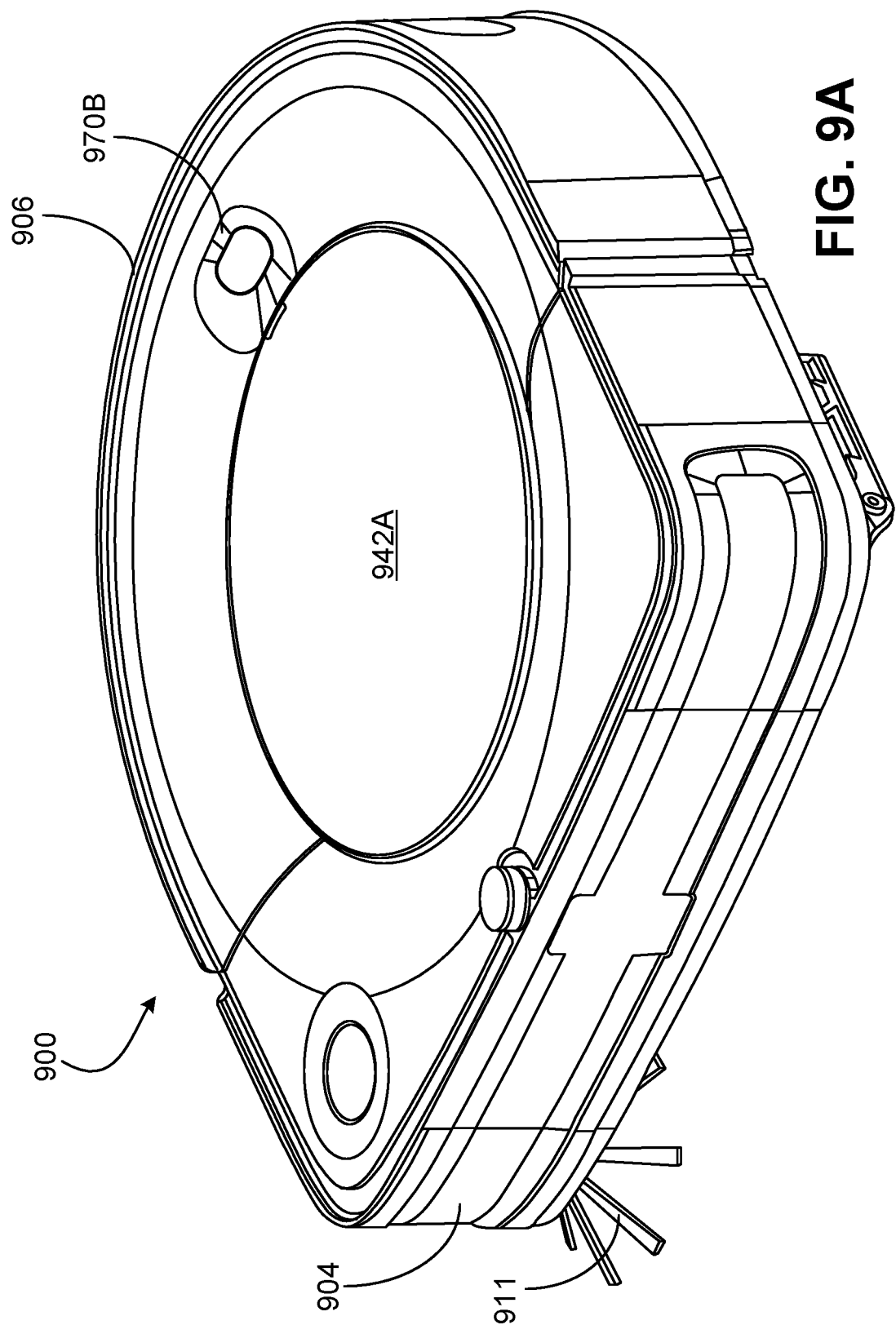
FIGS. 9A-9C are diagrams of an autonomous cleaning robot.
Figure 9B:
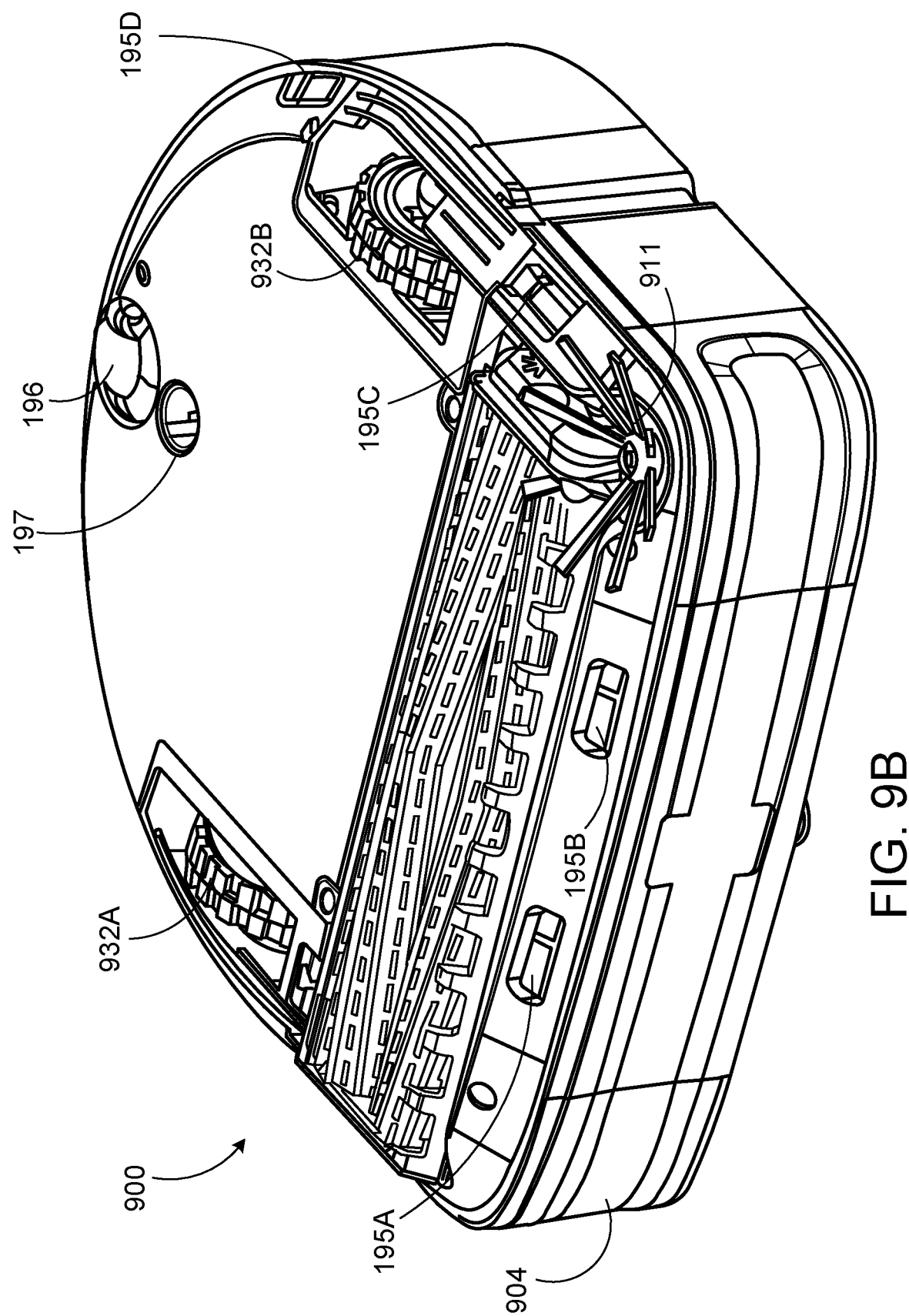
Figure 9C:
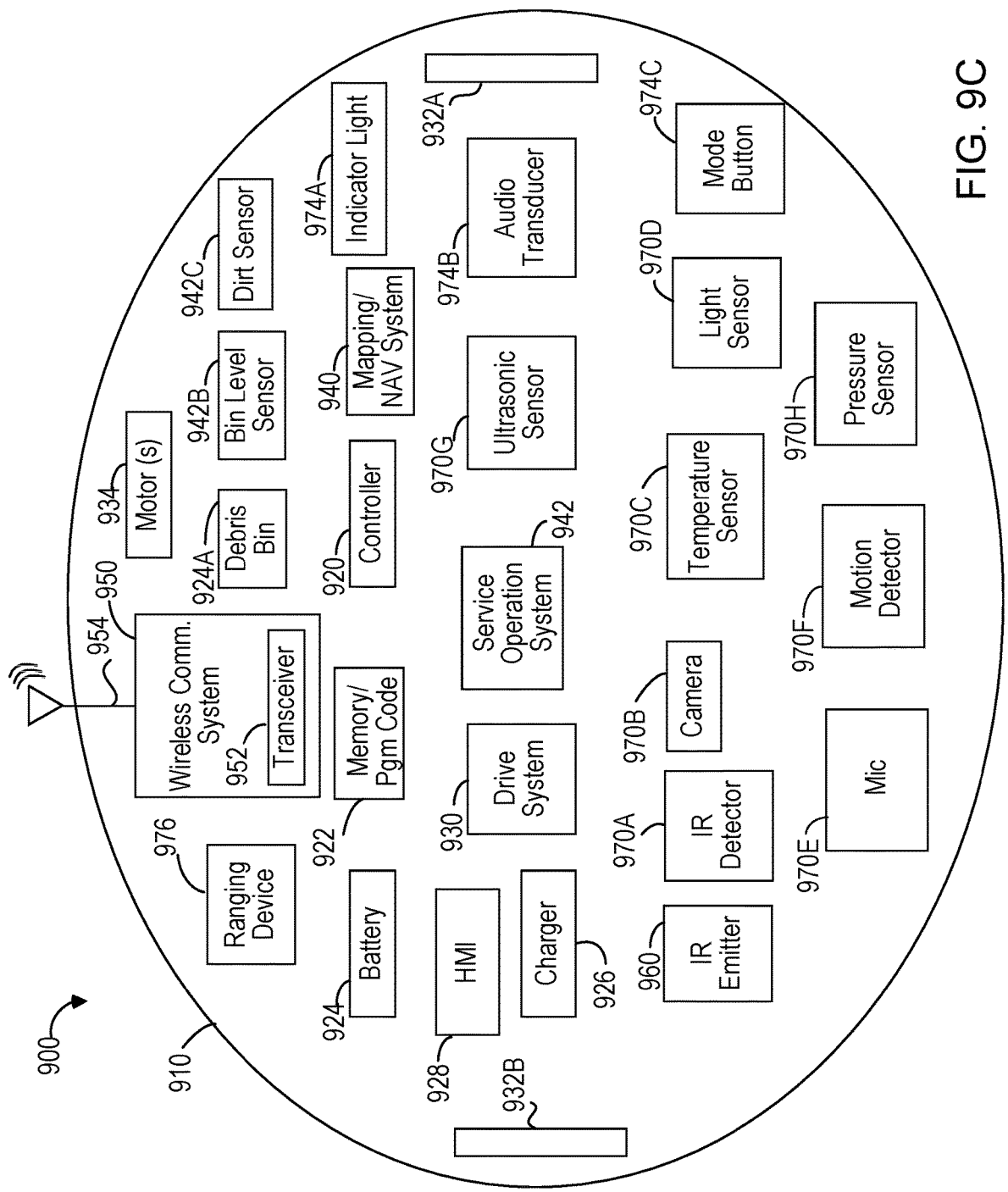

Referring to FIGS. 9A-9C, an example of an autonomous cleaning robot 900 includes a chassis 910, a controller 920, memory 922, a battery 924, a battery charger 926, a human-machine interface (HMI) 928, a drive system 930, a mapping/navigation system 940, a cleaning assembly 942, a wireless communication system 950, an IR emitter 960, environmental sensors 970A-H, a debris bin 942A (to store debris collected by a cleaning operation), a bin level sensor 942B, a dirt extraction sensor 942C (to detect the density of characteristics of the debris collected by the cleaning operation), an indicator light 974A, an audio transducer 974B, a ranging device 976, and a cleaning mode selection switch or button 974C.

The environmental sensors 970A-970H can include a camera 970B mounted on a top surface of the autonomous cleaning robot 900, as shown in the top perspective view of FIG. 9A. The camera 970B can be used to navigate the autonomous cleaning robot 900 and acquire images for other operational use. In some examples, the camera 970B can be a visual simultaneous location and mapping (VSLAM) camera and is used to detect features and landmarks in the operating environment and build an occupancy map based thereon.

As shown in the bottom perspective view of FIG. 9B, the autonomous cleaning robot 900 can include one or more of a bumper 904, cliff sensors 195A-195D, and an edge brush 911 mounted or otherwise positioned at a periphery of a housing 906 of the autonomous cleaning robot 900. The housing 106 is illustrated in FIGS. 9A-9B as having a squared front section on which the bumper 904 is mounted; however, the housing may have a rounded or circular shape in other embodiments. A caster wheel 196 can be disposed on the underside of the autonomous cleaning robot 900. In some examples, the caster wheel 196 can be positioned at an opposite end of the autonomous cleaning robot 900 than the cleaning assembly 942, with the drive rollers/tracks 932A, 932B therebetween, such that the cleaning assembly 942 is a cantilevered arrangement. The autonomous cleaning robot 900 may also include downward- or floor-facing camera 197. In some embodiments, the autonomous cleaning robot 900 may be generally configured in the manner of or include features from the Roomba® floor cleaning robot and/or robots as described in U.S. Pat. Nos. 7,024,278 and 8,374,721, the disclosures of which are incorporated herein by reference, with suitable modifications. In other embodiments, the autonomous cleaning robot 900 can be configured as an autonomous patrolling robot that includes a telescoping mast having one or more elements associated with the sensor elements 970A-H and/or the wireless communication circuit or system 950 mounted thereon or otherwise operably associated therewith.

The controller 920 can include any suitably configured processor or processors. The processor(s) can include one or more data processing circuits, such as a general purpose and/or special purpose processor (such as a microprocessor and/or digital signal processor) that may be collocated or distributed across one or more networks. The processor is configured to execute program code stored in the memory 922, e.g., a computer readable storage medium, to perform some or all of the operations and methods that are described above for one or more of the embodiments. The memory 922 is representative of the one or more memory devices containing the software and data used for facilitating operations of the robot in accordance with some embodiments of the present disclosure. The memory 922 can include, but is not limited to, the following types of devices: cache, ROM, PROM, EPROM, EEPROM, flash, SRAM, and DRAM. The processor is thus in communication with the controller 900, memory 922, the cleaning system 942 and drive system 930.

The drive system 930 can include any suitable mechanism or system for actively and controllably transiting the autonomous cleaning robot 900 through an environment (e.g., to and through a pet area). The drive system 930 can include a roller, rollers, track or tracks 932A, 932B and one or more onboard (i.e., carried by the autonomous cleaning robot 900) electric motors 934 operable by the controller 920 to convey the autonomous cleaning robot 900 across the floor of its operating environment.

The service operation system 942 is operable to execute a service operation in the living space 90. In some examples, the service operation system 942 includes a floor cleaning system that cleans a floor surface of an environment (e.g., a pet area) as the autonomous cleaning robot 900 transits through the environment. In some examples, the service operation system 942 can include a suction head and an onboard vacuum generator to vacuum clean the floor. In some examples, the service operation system 942 can include an end effector such as (but not limited to) a sweeping or mopping mechanism, one or more rotating brushes, rollers, wet or dry stationary or oscillating and/or vibrating cloths, or multilayer pad assemblies.

The wireless communication system 950 includes a wireless communication transceiver or module 952 and an associated antenna 954 to enable wireless communication between the robot 900 and other connected devices in the operating environment of the autonomous cleaning robot. For example, the wireless communication transceiver or module 952 may be a Wi-Fi module.

A number of embodiments have been described. Nevertheless, it will be understood that various modifications may be made without departing from the spirit and scope of the invention. For example, some of the steps described above may be order independent, and thus can be performed in an order different from that described.

Other implementations are also within the scope of the following claims.

What is claimed is:

1. An autonomous cleaning robot comprising:
   a drive operable to move the autonomous cleaning robot across a floor surface;
   a cleaning assembly configured to clean the floor surface;
   a vacuum configured to draw air into the autonomous cleaning robot;
   a receiver configured to receive an indication of pet activity in a pet area; and
   a controller configured to control the autonomous cleaning robot to form a pneumatic connection between the autonomous cleaning robot and a structure of a litter box in response to the received indication of pet activity,
   wherein a housing of the autonomous cleaning robot is configured to form the pneumatic connection between the autonomous cleaning robot and the structure of the litter box.

2. The autonomous cleaning robot of claim 1, wherein the vacuum is configured to draw the air into the autonomous cleaning robot through the pneumatic connection when the autonomous cleaning robot is connected with the structure of the litter box.

3. The autonomous cleaning robot of claim 1, wherein the housing of the autonomous cleaning robot is configured to form the pneumatic connection by mating with a port on the litter box.

4. The autonomous cleaning robot of claim 1, wherein the air drawn into the autonomous cleaning robot is air from a general vicinity of the litter box or air internal to the litter box.

5. The autonomous cleaning robot of claim 1, further comprising a filter positioned such that the air drawn into the autonomous cleaning robot passes through the filter.

6. The autonomous cleaning robot of claim 1, wherein the controller is further configured to control the autonomous cleaning robot to perform a floor cleaning operation in the pet area.

7. The autonomous cleaning robot of claim 1, wherein the vacuum is configured to be operated at a higher power level when the autonomous cleaning robot is connected with the litter box than during a floor cleaning operation.

8. A system comprising:
   a litter box; and
   an autonomous cleaning robot comprising:
      a drive operable to move the autonomous cleaning robot across a floor surface;
      a cleaning assembly configured to clean the floor surface;
      a vacuum configured to draw air into the autonomous cleaning robot;
      a receiver configured to receive an indication of pet activity in a pet area; and
      a controller configured to control the autonomous cleaning robot to form a pneumatic connection between the autonomous cleaning robot and a structure of the litter box in response to the received indication of pet activity,
      wherein a housing of the autonomous cleaning robot is configured to form the pneumatic connection between the autonomous cleaning robot and the structure of the litter box.

9. The system of claim 8, wherein the vacuum is configured to draw the air into the autonomous cleaning robot through the pneumatic connection when the autonomous cleaning robot is connected with the litter box.

10. The system of claim 8, wherein the air drawn into the autonomous cleaning robot is air from a general vicinity of the litter box or air internal to the litter box.

11. A method performed by an autonomous cleaning robot, the method comprising:
   receiving an indication of pet activity in a pet area;
   responsive to receiving the indication of pet activity, navigating to the pet area;
   responsive to receiving the indication of pet activity, forming a pneumatic connection with a structure of a litter box in the pet area; and
   operating a vacuum to draw air into the autonomous cleaning robot.

12. The method of claim 11, wherein operating the vacuum comprises operating the vacuum at a higher power level than during a floor cleaning operation.

13. The method of claim 11, wherein operating the vacuum comprises drawing the air into the autonomous cleaning robot through the pneumatic connection with the litter box.

14. The method of claim 11, wherein operating the vacuum comprises drawing the air into the autonomous cleaning robot from a general vicinity of the litter box or from internal to the litter box.

15. The autonomous cleaning robot of claim 1, wherein the structure of the litter box is disposed on a wall of the litter box.

16. The system of claim 8, wherein the structure of the litter box is disposed on a wall of the litter box.

17. The method of claim 11, wherein the structure of the litter box is disposed on a wall of the litter box.

* * * * *